Figure 1:
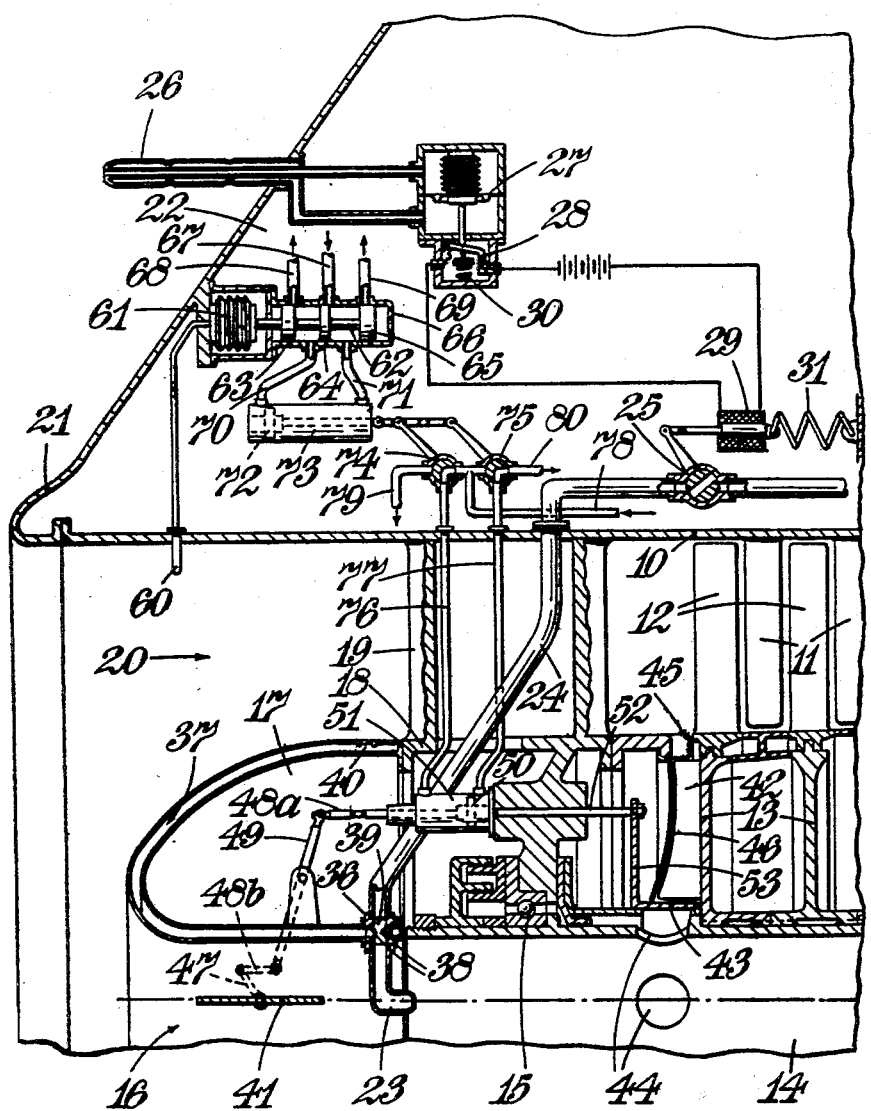

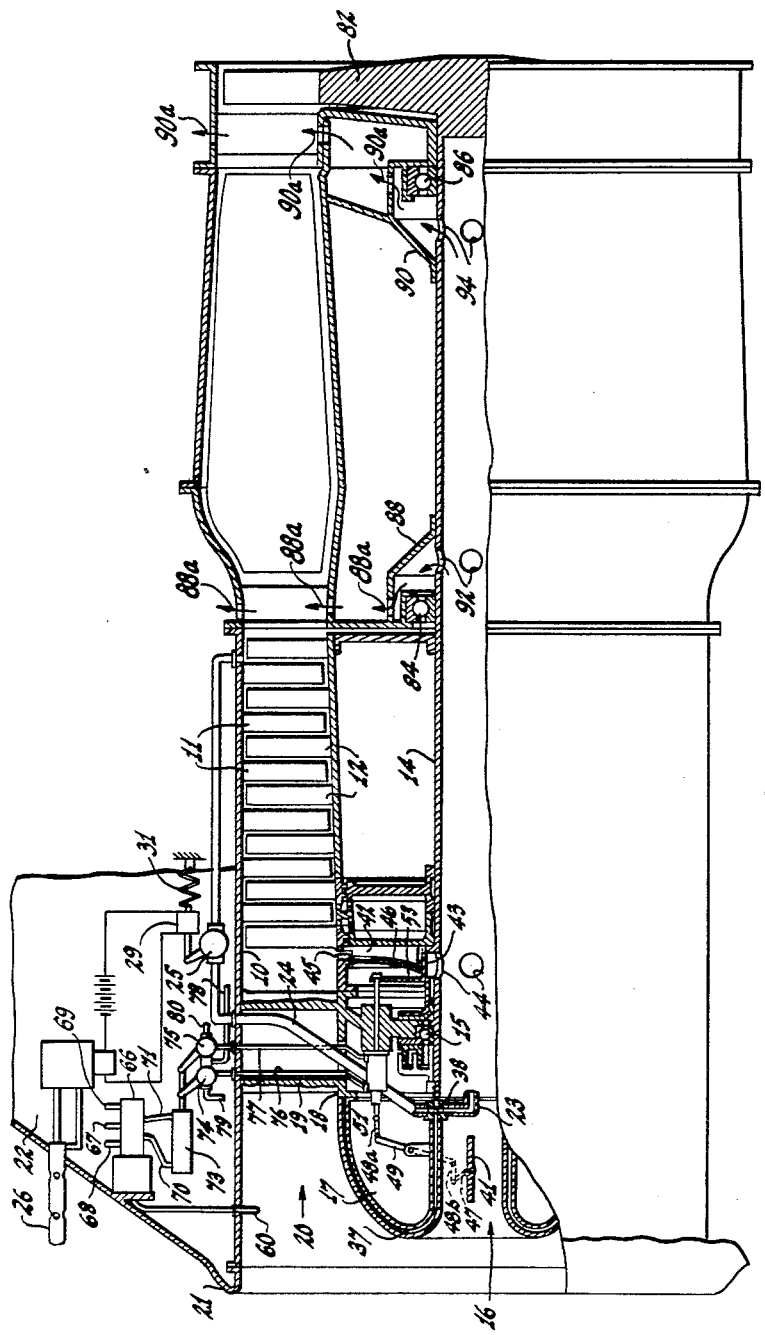

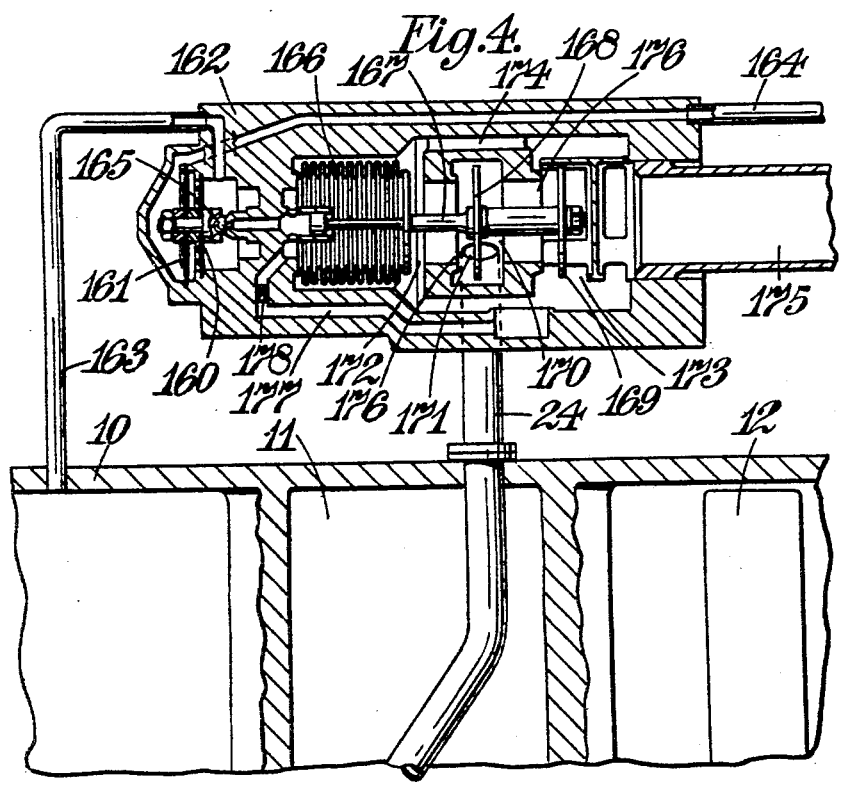

United States Patent Office 2,940,258
Patented June 14, 1960

2,940,258

SUPPLYING AIR TO INTERNAL COMPONENTS OF ENGINES

Adrian Albert Lombard, Quarndon, and David Ormi Davies, Kingsway, Derby, England, assignors to Rolls-Royce Limited, Derby, England, a British company Filed Jan. 10, 1955, Ser. No. 480,970

Claims priority, application Great Britain Jan. 25, 1954

14 Claims. (Cl. 60—39.66)

This invention relates to cooling arrangements in gas turbine engines.

With gas-turbine engines, it is necessary to provide means for cooling internal components of the engine, for instance the bearings of the engine rotor assembly which are often encircled by or located close to hot structure such as combustion equipment, turbines and exhaust assemblies, and heretofore it has been usual to use for this purpose air which has been tapped off from the engine compressor. Also it has been usual to use such cooling air for "sealing" purposes, that is for preventing the flow of hot combustion gases through gaps between stationary and rotating parts of the wall structure of the engine working fluid annulus, say between the periphery of a turbine disc and adjacent nozzle guide vanes which would otherwise result in undesirable heating of the turbine disc.

This invention has for an object to provide an improved arrangement for supplying such cooling or sealing air when the gas-turbine engine is employed for propelling high-speed aircraft.

According to the present invention in one aspect, in a gas-turbine engine for a high speed aircraft, there are provided means for supplying sealing air or cooling air to internal components of the gas-turbine engine comprising a cooling or sealing air distributing duct within the engine, which duct is arranged to be supplied substantially directly with ram pressurized air to be used as cooling or sealing air. By ram pressurized air is meant air which is compressed solely by the motion of the engine relative to the surrounding atmosphere.

According to one preferred feature of arrangements of this invention, the distributing duct extends centrally within a rotor assembly of the engine, and the main shaft of the rotor assembly may be made hollow and form part at least of the duct. In such arrangements, the ram pressurized air may be conveyed to the hollow shaft by having the forward end of the shaft open and in communication through its open end with the engine air intake, for instance in the case of an engine provided with an air intake bullet structure the shaft bore may communicate with the intake through a duct formed to extend through the bullet structure from its base forwardly to its apex to afford a forward continuation of the shaft bore. Heretofore, the bullet structure, when provided, has been fixed relative to the stationary structure of the engine, but according to a feature of the present invention the bullet structure may be arranged for rotation with the engine rotor assembly.

According to another feature of this invention, there may be provided injector or like means to assist to create an air flow in the distributing duct. The cooling or sealing air must be supplied at all times while the engine is running, even while the aircraft in which it is fitted is itself stationary, and the provision of injector or like means insures an adequate supply of cooling or sealing air when the ram pressure within the intake is insufficient to cause an adequate air flow through the distributing duct. The injector or the like means may conveniently be supplied for its operation with air tapped off from the engine compressor and the supply may be under control of a valve which is operated to cut off the supply when the aircraft Mach number exceeds a preselected value, or when the intake pressure or temperature exceeds a preselected value, or when there is a preselected rise of temperature due to the ram effect. The air tapped off from the compressor for this purpose may also be used for anti-icing purposes, and an over-ride control may be provided to insure the supply of anti-icing air when required.

According to the present invention in another aspect, in a gas-turbine engine, there is provided means for supplying sealing air or cooling air for internal components of the gas turbine engine comprising a cooling or sealing air distributing duct within the engine, and an expansion turbine, said duct being connected to be supplied with air through the expansion turbine, and said expansion turbine being directly connected to a main rotor comprising at least a compressor and a turbine of the engine, whereby the air turbine assists to drive said rotor.

The expansion turbine is preferably supplied with ram air, but may be supplied with air compressed in a compressor of the engine, and in one arrangement valve means are provided which are controlled to connect the expansion turbine to the compressor to be supplied with air therefrom below a preselected value of the aircraft Mach number, or of the intake pressure or temperature, or when the rise of temperature due to the ram effect exceeds a preselected value, the valve means being controlled to connect the expansion turbine to a source of ram air above the preselected value.

According to yet another feature of this invention, there is provided a connection between the distributing duct and the source of ram pressurized air through an air turbine connected to rotate with the main shaft of the engine rotor assembly, whereby the air is expanded to cool it and the air turbine assists to drive the rotor assembly. Such an arrangement may be employed with high-speed aircraft which are capable of travelling at such speeds that the ram pressurized air has a temperature which is too high for cooling purposes. The distributing duct may have both a direct connection to the source of ram pressurized air and a connection through a turbine as just set forth and there may be provided valve means operable to control the flow through the connections to open the second connection and close the first connection when the temperature of the ram pressurized air tends to become too high.

Figure 2:
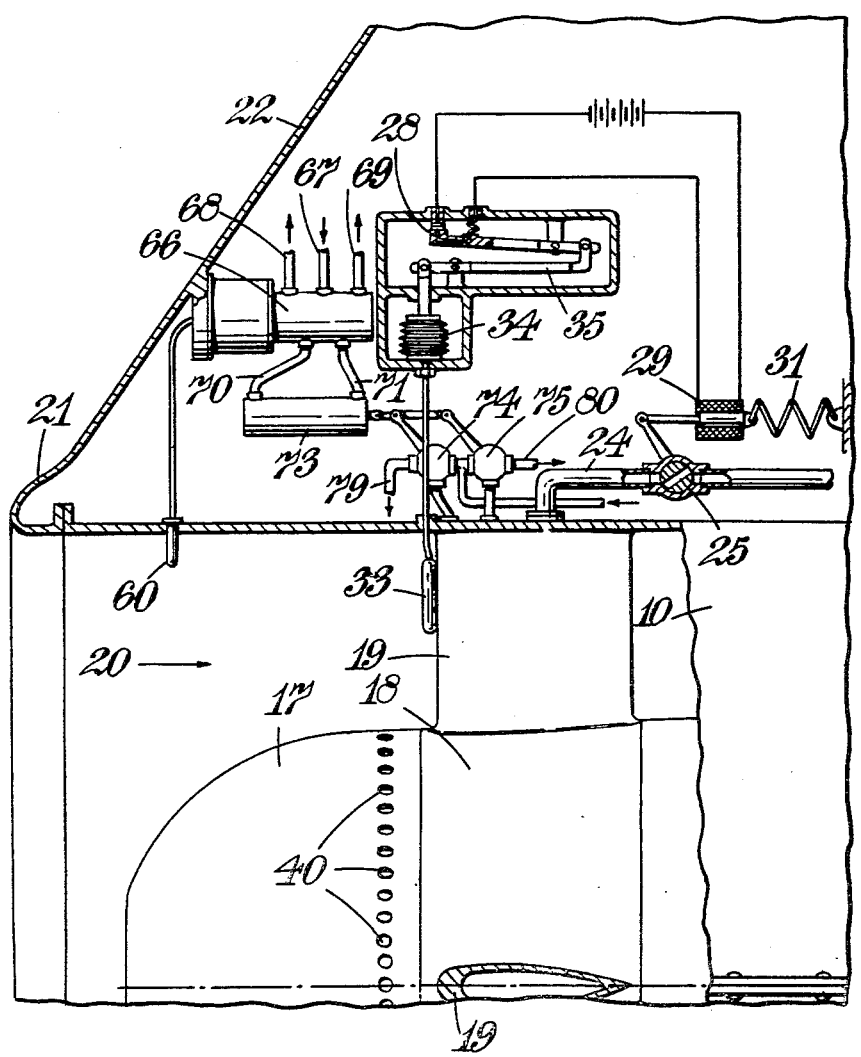
Figure 3:
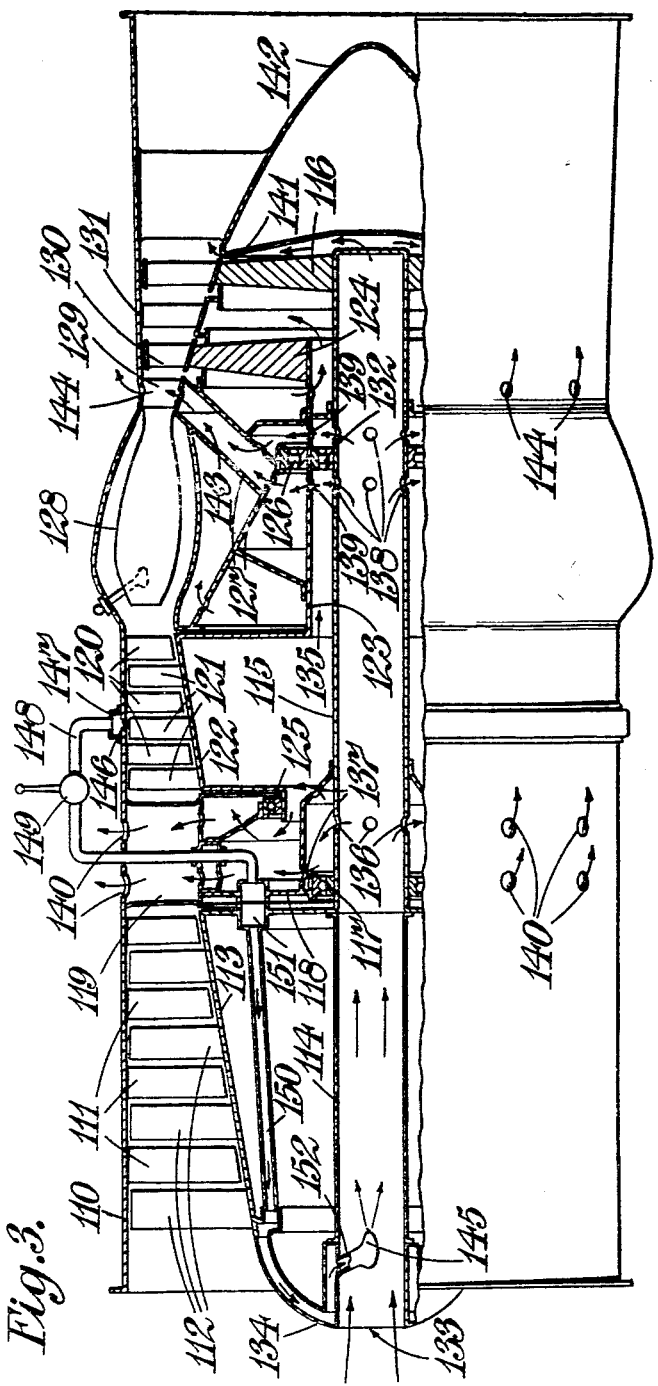

Some embodiments of this invention will now be described with reference to the accompanying drawings, in which:

Figure 1 is a sectional view of part of the compressor section of a gas-turbine engine and of the air intake thereto, Figure 1A is a side elevational view of a gas turbine engine embodying the invention with parts broken away and parts in section, Figure 2 illustrates a modification of part of the arrangement shown in Figure 1, Figure 3 is a sectional view of another gas-turbine engine embodying the invention, and Figure 4 is a view of a control arangement in accordance with the invention.

Referring to Figure 1, there is shown the entry end of a compressor of a gas-turbine engine, and the compressor comprises a stator casing 10 carrying rows of stator blades 11 which alternate with rows of rotor blades 12 mounted at the peripheries of discs 13 forming part of a rotor assembly of the engine. The discs 13 are carried by and rotate with a central hollow shaft 14 which extends through the compressor, and a shaft driven by a turbine rotor is connected to the hollow shaft at its end remote from the compressor inlet, to drive it.

The rotor assembly is supported in bearings spaced axially of the engine, there being a bearing near the forward end of the compressor shaft 14, for example as indicated at 15, a bearing adjacent the rear end of the compressor shaft and bearing adjacent the turbine. Some at least of these bearings require cooling in operation and this is done by passing cooling air round the bearing structure.

The cooling air is distributed through the engine by means of the hollow shaft 14 the bore of which forms an air distributing duct within the rotor of the engine and in certain cases also through a hollow turbine shaft, and the air is ram-pressurised air obtained through an inlet duct 16 formed centrally of an air intake bullet structure 17 to lead directly to the distributing duct formed by the bore of the shaft 14, the front end of which is left open. The air is conducted from the shaft 14 around the bearings, for instance in a manner similar to that described below with reference to Figure 3.

The bullet structure 17 is supported by the outer wall 18 of a housing for the front bearing 15 and this wall also forms the inner boundary of the annular compressor air intake passage and is connected by hollow streamlined struts 19 to the outer casing 10 of the compressor. The struts 19 extend across the intake passage 20 of the compressor. The wall 10 at its forward end connects with a nose fairing 21 forming part of an aircraft wing or fuselage structure 22 in which the engine is mounted.

It will be clear that in normal operation of the aircraft in flight, ram-pressurized air will enter the hollow shaft 14 from the intake through the direct inlet duct 16 and will thus be distributed internally of the engine for cooling purposes. The air may also be employed for sealing purposes as above described at locations in the working fluid duct if the pressure of the engine working fluid is always below the pressure of the cooling and sealing air, say to seal the clearance between the downstream side of the turbine and the exhaust bullet.

The left hand portion of Figure 1A of the drawings incorporates all the elements shown in Figure 1 of the drawings and the same reference numbers have been applied to the corresponding elements. Figure 1A also shows the turbine 82 for driving the compressor supported in bearings 84, 86 which are cooled by air flowing from the distributing duct 14. The bearing 84 is cooled by air leaving the duct 14 through ports 92, this air being conducted over the bearing by the support housing 88. The bearing 86 is cooled by air leaving the duct 14 through ports 94, and this air is conducted over the bearing by the part 90 of the radially-extending diaphragm. After the air passes over the bearings 84 and 86, the air leaves the bearing housings and escapes to atmosphere through suitable openings in the paths indicated by arrows 88a and 90a, respectively.

When the aircraft is flying at low speeds the ram pressure will not be high enough to ensure an adequate flow of cooling air, nor will there be an adequate flow of air when the engine is running with the aircraft stationary, and there is therefore provided means to ensure an adequate flow under these conditions.

The means comprises either an injector device 23 at the inlet to the shaft 14, or an ejector device at the downstream end of the distributor bore, and the device is connected by a pipe 24 to be supplied with compressed air tapped from the engine compressor. The injector or ejector device will induce a flow of air in the inlet duct 16 and hollow shaft 14 when the ram pressure is too low.

The pipe 24 has a control valve 25 in it which may be operated in accordance with the flight Mach number; for instance a pitot-static tube 26 may be provided to operate a pressure-ratio-responsive element 27 in the form of a diaphragm and evacuated expansible capsule, which element 27 in turn operates a switch 28 controlling the supply of energizing current to a solenoid 29 for operating the valve 25. When the aircraft Mach number, and thus the ratio of pitot pressure to static pressure, exceeds a pre-selected value the diaphragm 27 closes the switch 28 against the spring 30 and the solenoid 29 is energised to move the valve 25 to its closed position against the action of spring 31.

Alternatively, the switch 28 may be closed when the temperature in the air intake reaches a certain value due to the ram effect, as shown in Figure 2, or when the difference between the intake temperature and the static temperature of the ambient atmosphere reaches a selected value. In the arrangement of Figure 2 a temperature-sensitive element 33 is provided in the intake passage 20 and is arranged to cause expansion and contraction of an expansible capsule 34 connected by a lever 35 to operate the switch 28.

Alternatively the switch 28 may be operated in accordance with the ram pressure rise, e.g. the difference between pitot and static pressure, or in accordance with the absolute pressure of the ram air, by means which will be well known to those skilled in the art. Instead of the electrical circuit shown any other convenient means may of course be used to control the air supply to the injector.

One arrangement in which the control valve in the pipe between the compressor delivery and the injector is controlled substantially in accordance with the flight Mach number is shown in Figure 4. In this arrangement the valve is controlled in accordance with the ratio between the ram pressure measured in the engine inlet, and the pressure at the point at which the cooling air is vented to atmosphere. While these pressures are substantially the aircraft total head and static pressures respectively, it will be appreciated that they are more directly related to the rate of cooling air flow and take into account variations in intake efficiency and variations of the outlet pressure from the true static pressure.

The control valve arrangement comprises a pair of diaphragms 160, 161 of different effective areas, the diaphragms being in sealed relation to a casing 162 and the space between them being evacuated. The smaller diaphragm 160 is subjected to the engine intake pressure through a pipe 163 connected to casing 10 upstream of the blades 11, 12, while the larger diaphragm is subjected to the cooling air outlet pressure by means of a pipe 164 connected to the port through which the cooling air flows to atmosphere.

Connected to the diaphragm assembly is a half-ball valve 165, which controls the outlet from the interior of a capsule stack 166. The capsule stack is secured at one end to the casing 162 and at its free end carries a rod 167 to which are secured disc-like valve members 168, 169. The space 170 between the valve members is connected through an outlet port 171 in the casing 162 to that part of pipe 24 leading to the injector, while the spaces 172, 173 on either side of the members 168, 169 are connected through conduits 174, 175 to the delivery of a high-pressure stage of the compressor, referred to as the compressor delivery.

The casing 162 is provided with transverse walls having central apertures 176 therein which are closed by the valve members 168, 169, and there are provided seatings around the apertures to co-operate with the valve members. There is also provided a connection 177 from one of the spaces 172, 173 to the interior of the capsule stack 166, the connection 177 having in it a restrictor 178. There may also be provided a relief valve arranged to open when the pressure difference from outside to inside the capsule exceeds a predetermined maximum value.

The control valve arrangement operates as follows. When the ratio of ram pressure to cooling air outlet pressure is low, i.e. at low flight speeds and under stationary conditions, the half-ball valve 165 is closed, and both the interior and the exterior of the capsule are subjected to compressor delivery pressure. Under these conditions the resilient load of the capsule holds the valves 168, 169 off their seatings and compressor delivery air flows through conduits 174, 175 and port 171 to the injector, thus entraining air into the distributing duct.

When the ratio referred to exceeds a preselected value, the half-ball valve 165 is caused to open, and due to the restrictor 178 the pressure within the capsule 166 is reduced. This causes the valves 168, 169 to be held onto their seatings, cutting off the flow of compressor delivery air to the injector.

Referring again to Figure 1, the pipe 24 may also be arranged to supply anti-icing air to the bullet structure 17. For instance, a ferrule 36 may be provided in the wall of the structure 17 and the latter may be made double-skinned to leave an air space 37 between the skins, and the ferrule may have ports 38 in it opening into the space 37 from a bore 39 therethrough. The pipe 24 and injector 23 are connected into the ends of the bore 39 in the ferrule 36. Thus air flowing in the pipe 24 passes partly to the injector 23 and partly into the space 37. After heating the surface of the bullet 17, some of the air leaves the space 37 through ports 40 to flow over wall 18 and thus to prevent ice formation thereon.

A by-pass may be arranged around valve 25 so that even when switch 28 is closed, indicating that the ram pressure is high enough to avoid the need to use the injector, anti-icing air may be supplied through the by-pass, which may contain a valve which is opened when icing conditions are suspected, to the air space 37.

When the aircraft is flying at very high speeds, the temperature of the ram air may be too high for efficient cooling of internal engine components, and the following arrangement may be provided to maintain the supply of cooling air.

A butterfly valve 41 is provided in the inlet passage 16 and an inward-flow turbine 42 is provided at the inlet end of the compressor rotor, and there is provided a sleeve valve 43 to control the connection of its outlet through ports 44 with the bore of shaft 14. The turbine inlet 45 opens to the passage 20 and the walls of the turbine are afforded by the upstream disc 13 and by a diaphragm 46 mounted within the front bearing housing.

The butterfly valve 41 has an operating arm 47 connected by links 48a, 48b and a lever 49 to a piston 50 of a ram 51, and the piston 50 is also connected by its piston rod 52 to a flange 53 on the sleeve valve 43. The arrangement is such that when the valve 41 is opened, valve 43 is closed, and vice versa.

When the temperature of the ram air is too high valve 43 is opened and valve 41 closed, and so air enters the shaft 14 after being expanded through the turbine 42 and thus after being cooled. The power developed in the turbine 42 is employed to assist to drive the engine compressor, and so may reduce the specific fuel consumption of the engine.

Instead of operating the valves 41, 43 simultaneously it may be arranged that valve 43 is opened before valve 41 is closed, and that valve 41 is opened before valve 43 is closed, thereby to avoid cutting off the cooling or sealing air supply.

The valves 41, 43 are preferably operated in accordance with the temperature of the intake air, through the valves may be operated at a selected value of any of the variables mentioned in connection with the operation of valve 25. It will be appreciated that the selected value at which valves 41, 43 are operated will be higher than that at which valve 25 is operated. For example where the valves are operated in accordance with the difference between the ambient atmospheric temperature and the ram air temperature the valve 25 may be closed at a value for the difference of 25° C. corresponding to an airspeed of 500 m.p.h., and the valve 41 may be closed, and valve 43 opened, at a value for the difference of say 121° C. corresponding to an airspeed of 1100 m.p.h.

In the arrangement of Figure 1 there is shown a temperature-sensitive element 60 in the air intake 20 connected in known fashion to cause expansion of a capsule 61 on increase of temperature. The free end of capsule 61 has connected to it a piston valve member 62 having three lands 63, 64, 65, and the valve member 62 is slidable in valve housing 66. The housing has a central connection 67 to a source of pressure fluid, and two drain connections 68, 69, and it is arranged that at the selected temperature the lands 63, 64, 65 register with connections 68, 67, 69, respectively, the width of land 64 being equal to the width of connection 67 and the distance between the lands being equal to the distance between the connections. The housing 66 also has a pair of connections 70, 71 respectively between connections 67, 68, and between connections 67, 69 and connections 70, 71 lead one to each side of a piston 72 in a cylinder 73.

Thus, above the selected temperature the pressure connection 67 will be in communication with connection 70 to the left-hand side of piston 72 as seen in the figure, and the connection 71 will be in communication with drain 69, causing piston 72 to move to the right-hand end of cylinder 73, and below the selected temperature, connection 67 will be in communication with connection 71 and connection 70 will be in communication with drain 68 so that piston 72 will be moved to the left-hand end of the cylinder.

Piston 72 is connected to operate a pair of valves 74, 75, which are connected respectively to conduits 76, 77 leading to opposite ends of the cylinder of ram 51 to contact conduits 76, 77, alternatively to a high-pressure fluid source 78 and to drain pipes 79, 80. Valves 74, 75 are interlinked so that when conduit 76 is connected to the pressure fluid source, conduit 77 is connected to drain, and vice versa. It is aranged that when the temperature sensed by element 60 is less than the selected value, the piston 72 causes valve 74 to connect conduit 76 to pressure source 78 and causes valve 75 to connect conduit 77 to drain 80. Piston 50 is therefore moved to the right-hand end of its cylinder (as shown in Figure 1) to open butterfly valve 41 and close valve 43. When the temperature is above the selected value, valve 41 is closed and valve 43 opened.

Referring now to Figure 3, there is shown a gas turbine engine of the compound type having a low-pressure compressor driven by a low-pressure turbine and a coaxial high-pressure compressor driven by a high-pressure turbine. Air drawn in by the low-pressure compressor passes from the delivery of the low-pressure compressor to the inlet of the high-pressure compressor, and the air then passes from the delivery of the high-pressure compressor to the combustion equipment which is shown as of the turbo-annular kind, having a number of separate flame tubes in an annular air casing. From the outlet of the combustion equipment combustion gases pass through the high-pressure and low-pressure turbines in series and into an annular exhaust duct.

The engine comprises a stationary casing 110 for the compressors and the low-pressure compressor comprises rows of stator blades 111 mounted in the casing 110 which alternate with rows of rotor blades 112 mounted on the periphery of a compressor rotor drum 113. The rotor drum 113 is driven through shaft 115 by the low-pressure turbine rotor 116, and mounted within rotor drum 113 is a coaxial sleeve 114 which is secured to the upstream end of shaft 115. The low-pressure compressor rotor drum 113 is supported by a bearing 117 carried in a bearing housing structure 118 which is supported from the outer stationary compressor casing structure 110 through hollow struts 119 extending across the working fluid passage of the engine between the low-pressure and high-pressure compressors.

The high-pressure compressor of the engine comprises a number of rows of stator blades 120 mounted in the stator casing 110, and a number of rows of rotor blades 121 at the periphery of a rotor drum 122. The rotor drum 122 is connected to a high-pressure shaft 123 which also carries a high-pressure turbine disc 124 by which the high-pressure compressor is driven. The rotor drum 122 is supported at its upstream end by a bearing 125 carried in the stationary housing structure 118, and the shaft 123 is supported between its ends in a bearing 126 carried in a backbone structure 127 located within the combustion equipment 128.

The structure 127 has connected to it hollow nozzle guide vanes 129 extending across the working fluid passage of the engine upstream of the high-pressure turbine rotor blades 130 and secured at their outer ends to an outer casing 131 of the turbine structure.

Coaxially within the bearing 126 between the high-pressure shaft 123 and the low-pressure shaft 115 there is provided a roller bearing 132 supporting the low-pressure shaft 115 and its turbine disc 116.

Cooling air is provided for the purpose of cooling the bearings of the engine by being passed through the structure surrounding the bearings, thus preventing transmission of heat to the bearings from adjacent hot structure such as the combustion equipment and turbines. The air may also be used in suitable cases for sealing the face of a turbine against the ingress of hot gas from the working fluid duct, by passing the cool air outwardly over the face of the turbine through a sealing gap formed between the periphery of the turbine disc and the adjacent stationary structure. It will be appreciated that the pressure of the cooling air should always be higher than that of the working fluid adjacent the sealing gap, and it may be noted that the pressure in the working fluid duct is lowest on the downstream side of a turbine and therefore the cooling air pressure required to seal the clearance between the downstream face of the low-pressure turbine disc 116 and the exhaust bullet is less than that required for the other faces.

The cooling air is distributed through the engine by means of the sleeve 114 and shaft 115 which are made hollow for this purpose. The sleeve 114 is open at its forward end to receive the ram-pressurised air from the forwardly-facing air intake to the engine. The ram air is admitted to within sleeve 114 through an inlet duct 133 formed centrally of a double-skinned nose fairing 134 which is attached to the forward end of the compressor rotor drum 113 to rotate therewith.

The sleeve 114 and shaft 115 of the low-pressure rotor assembly together form a continuous hollow duct, and the compressor drum 122 and shaft 123 of the high-pressure rotor assembly together form an annular hollow duct 135 surrounding the downstream part of the low-pressure rotor assembly.

The cooling air flowing within the hollow sleeve 114 and shaft 115 is distributed around the bearings 117, 125, 126 and 132 to cool them in the following manner.

Ports 136 are formed in the shaft 115 to allow part of the cooling air to flow into the space defined between shaft 115 and the housing 118, and this part of the air flows adjacent to bearing 117 to cool it and flows out from this space via ports 137 into the housing structure 118 itself thereby to cool the bearing 125.

The cooling air leaves the housing 118 and flows to atmosphere through the hollow struts 119 and ports 140.

A further part of the air from the shaft 115 flows through ports 138 into the space between the shafts 115 and 123 thus cooling the bearing 132, and then flows through ports 139 in shaft 123 to cool bearing 126.

It may be arranged that some of the air flowing in shaft 115 flows through an orifice at its downstream end, the size of which may be selected so as to give the desired airflow, to between the downstream face of the low-pressure turbine disc 116 and the upstream face of the exhaust bullet 142 to provide sealing air which flows into the exhaust duct through the gap 141 between the turbine disc 116 and the periphery of the exhaust bullet 142. It will be appreciated that it is necessary that the sealing air in shaft 115 is always at a higher pressure than that of the working fluid in the exhaust cone.

The air which cools bearing 126 flows outwards through a passage 143 in the structure 127 and thence through the hollow nozzle guide vanes 129 and ports 144 to atmosphere.

As in the construction of Figure 1, when the aircraft is flying at low speeds or is stationary with the engine running, the flow of cooling air due to ram pressure will be inadequate, and there is therefore provided an injector 145 within the duct 133 through which air, which is tapped off from a stage of the compressor at which the air is at a suitable pressure, is emitted to induce a flow of cooling air from the intake through duct 133. The compressed air is supplied to the injector 145 in the following manner.

The delivery of the high-pressure compressor is formed with ports 146 in its outer wall leading to a manifold 147, and a conduit 148 leads from the manifold 147 and has fitted in it a control valve 149. The control valve 149 is controlled in any of the ways described in relation to valve 25 of Figures 1 and 2, or as described in relation to the control valve of Figure 4. A duct 150 is formed within the low-pressure compressor rotor 113, and the conduit 148 is led through a strut 119 to a transfer manifold 151 comprising parts on the housing 118 and on the rotor 113, the duct 150 leading from the transfer manifold 151 to between the skins of the nose fairing 134. A hollow strut 152 leads to the injector 145 supported from the wall of duct 133. Thus the air tapped from the compressor passes to the injector 145 through the double skin so that the nose fairing 134 is protected against ice formation, due to the temperature of the air tapped from the compressor.

In another arrangement, the inlet of the expansion turbine which is secured to the rotor of the engine may be connected to the delivery of a stage of the compressor of the engine, and in this way cooling and sealing air at a higher pressure may be obtained. In a preferred arrangement the inlet of the expansion turbine may be connected through ducts both to the air intake and to the delivery of a stage of the compressor, valve means being provided in one or both ducts to place the inlet selectively in communication with the air intake and the compressor delivery in accordance with the aircraft Mach number, the intake pressure or temperature, or the pressure or temperature rise due to the ram effect. The valve means will be arranged to cut off the communication with the compressor delivery and to open that to the intake when the selected variable exceeds a predetermined value.

We claim:

1. A gas turbine engine for a high-speed aircraft comprising a stationary structure, a rotor including a compressor and a turbine of the engine, bearing means by which said rotor is mounted in said stationary structure, and means for cooling said bearing means comprising a cooling air distributing duct within the rotor, means to conduct cooling air from said duct around said bearing means, a first source of ram pressurized air comprising an air intake opening directly into the distributing duct, a second source of ram pressurized air connected to deliver into said duct and comprising a second air intake, at least one of said intakes facing forwardly to receive air which is ram pressurized by motion of the aircraft, valve means controlling the flow of air into the air distributing duct from both said sources to disconnect the first source from the duct and connect the second source to the duct, means responsive to an operating variable which is associated with the engine and which increases with increase of ram pressure, said operating variable-responsive means being connected to operate the valve means at a selected value of the operating variable, and a radial flow expansion turbine extending between said second source of pressurized air and the cooling air distributing duct so that the air from said second source is delivered to the duct through the expansion turbine and the turbine is mounted on the rotor of the engine within said stationary structure to assist in driving said rotor.

2. A gas turbine engine for a high-speed aircraft comprising a stationary structure, a rotor including a compressor and a turbine of the engine, bearing means by which said rotor is mounted in said stationary structure, and means for cooling said bearing means comprising a cooling air distributing duct within the rotor, means to conduct cooling air from said duct around said bearing means, an air intake facing forwardly in the direction of flight of said aircraft to receive air pressurized by the motion of the aircraft, a radial flow expansion turbine extending radially between the air intake and the cooling air distributing duct and having its inlet in direct communication with said intake having its outlet in direct communication with said duct and being mounted on said rotor assisting to drive said rotor, a direct communication between said intake and said duct in parallel with said expansion turbine, valve means to close said last-mentioned communication and to open the connection through the expansion turbine, and means responsive to an operating variable of the engine which increases as the ram pressure in said intake increases, said operating-variable-responsive means being connected to actuate the valve means to close the direct communication and open the connection through the expansion turbine at a selected value of the operating variable.

3. A gas turbine engine as claimed in claim 2, wherein said valve means comprises a first valve adapted to control the flow through said direct connection, a second valve to control the flow through said expansion turbine and means linking said valves in operation.

4. A gas turbine engine for a high speed aircraft comprising stationary structure, a rotor including a compressor and a turbine of the engine, a compressor air intake wherein air is ram pressurized in forward flight, bearing means supporting the rotor in said stationary structure, and means for cooling said bearing means comprising a cooling air distributing duct within the rotor, means communicating with said distributing duct and connected to conduct cooling air from said duct around said bearing means, an air intake disposed at the forward end of the engine and facing forwardly in the direction of flight of said aircraft to receive air pressurized by the motion of the aircraft, said air intake being in direct communication with said duct, a radial flow expansion turbine extending radially between the compressor air intake and the cooling air distributing duct and having its inlet in direct communication with said compressor air intake and having its outlet in direct communication with said duct, said expansion turbine being directly mounted on said rotor to assist in driving said rotor, means to induce a flow of air through said duct including nozzle means opening into the duct and facing downstream of the direction of cooling air flow in the duct, and means connected to supply air under pressure to said nozzle means thereby to induce a flow of air through said duct, valve means connected to control the flow of air into said duct from said air intakes and said nozzle means, and means responsive to an operating variable of the engine which increases with increase of ram pressure in said intakes, said operating-variable responsive means being connected to operate said valve means to cut off flow of air from said nozzle means at values of the variable below a first selected value and to close off said direct air intake and open the connection from the outlet of the expansion turbine at a second selected value of the operating variable greater than the first selected value.

5. A gas turbine engine for a high-speed aircraft comprising a stationary structure, a rotor including a compressor and a turbine of the engine, bearing means supporting said rotor in said stationary structure, and means for cooling said bearing means comprising a cooling air distributing duct within the rotor, means communicating with said distributing duct and connected to conduct cooling air from said duct around bearing means, an air intake disposed at the forward end of the engine and facing forwardly in the direction of flight of said aircraft to receive air pressurized by the motion of the aircraft, a radial flow expansion turbine extending radially between the air intake and the cooling air distributing duct and having its inlet in direct communication with said intake and having its outlet in direct communication with said duct, said expansion turbine being directly mounted on said rotor to assist in driving said rotor, a direct communication between said intake and said duct in parallel with said expansion turbine, valve means controlling flow from said intake through said expansion turbine and said direct communication and adjustable between a position in which said last-mentioned communication is closed and the connection through the expansion turbine is open and a position in which the connection through the expansion turbine is closed and the direct communication is open, and means to induce a flow of air through said duct including nozzle means opening into said duct and facing downstream of the direction of cooling air flow in the duct, and pressure air supply means connected to supply air under pressure to said nozzle means thereby to induce a flow of air through said duct, and means responsive to an operating variable of the engine which increases with increase of ram pressure in said intake, said operating-variable responsive means being connected to operate said valve means to cut off flow of air from said nozzle means at values of the variable below a first selected value and to close off said direct communication and open the connection from the outlet of the expansion turbine at a second selected value of the operating variable greater than the first selected value.

6. A gas turbine engine as claimed in claim 5, wherein said distributing duct extends centrally within said rotor of the engine and the rotor has a main shaft which is hollow and forms part at least of the distributing duct.

7. A gas turbine engine as claimed in claim 5, wherein said distributing duct extends centrally within said rotor of the engine and the rotor has a main shaft which is hollow and forms part at least of the distributing duct, and wherein said main shaft has its forward end open and is in direct communication with the air intake through its open end.

8. A gas turbine engine as claimed in claim 7, comprising also an intake fairing structure connected to the forward end of said rotor to rotate therewith and having a duct formed therein which is in communication at one end with said hollow main shaft and at its other end with the intake.

9. A gas turbine engine as claimed in claim 5, wherein said valve means comprises a first valve adapted to control the flow through said direct communication, a second valve adapted to control the flow through said expansion turbine and means linking said valves in operation.

10. A gas turbine engine according to claim 1, wherein said valve means on operation disconnects one source from and simultaneously connects the other source to the air distributing duct.

11. A gas turbine engine according to claim 1, wherein said valve means on operation first connects the inoperative one of the two sources to the air distributing duct, and thereafter disconnects the other of the two sources from the air distributing duct.

12. A gas turbine engine according to claim 1, further comprising a pressure-air-operated flow-inducing device mounted in said air intake having direct connection with the air distributing duct, a pressure air supply connection conveying air from said compressor of the engine and connected to deliver to said flow-inducing device, second valve means in said air supply connection to control flow therein, and second operating-variable responsive means responsive to an engine operating variable which varies with ram pressure, said second operating-variable responsive means being connected to open said second valve means at below a second selected value of the operating variable.

13. A gas turbine engine for a high-speed aircraft comprising a stationary structure, a rotor including a compressor and a turbine of the engine, bearing means by which said rotor is mounted in said stationary structure, and means for cooling said bearing means comprising an air intake facing forwardly in the direction of flight of said aircraft to receive air pressurized by the motion of the aircraft, a cooling air distributing duct within the engine communicating with said air intake, means having direct communication with said distributing duct to conduct cooling air from said air intake around said bearing means, a radial flow expansion turbine extending between said duct and said air intake and having its inlet in direct communication with said air intake, having its outlet in direct communication with said distributing duct and being mounted on said rotor assisting to drive said rotor, a direct communication between said air intake and the distributing duct, valve means to interrupt said direct communication between said air intake and the distributing duct and to open the communication through the expansion turbine between the duct and the air intake, and means responsive to an operating variable of the engine which increases as the ram pressure in said air intake increases, said operating variable-responsive means being connected to actuate the valve means to interrupt the direct communication between said air intake and the distributing duct and open the communication through the expansion turbine between the duct and the air intake at a selected value of the operating variable.

14. A gas turbine engine for a high-speed aircraft comprising a stationary structure, a rotor including a compressor and a turbine of the engine, bearing means supporting said rotor in said stationary structure, and means for cooling said bearing means comprising a cooling air distributing duct within the rotor, means communicating with said distributing duct and connected to conduct cooling air from said duct around said bearing means, an air intake disposed at the forward end of the engine and facing forwardly in the direction of flight of said aircraft to receive air pressurized by the motion of the aircraft, a radial flow expansion turbine extending between said intake and said cooling air distributing duct and having its inlet in direct communication with said intake and having its outlet in direct communication with said duct, said expansion turbine being directly mounted on said rotor to assist in driving said rotor, a direct communication between said intake and said duct in parallel with said expansion turbine, valve means controlling flow from said intake through said expansion turbine and said direct communication between said intake and said duct and adjustable between a position in which said last-mentioned communication is closed and the connection through the expansion turbine is open and a position in which the connection through the expansion turbine is closed and the direct communication is open, and means to induce a flow of air through said duct including nozzle means opening into said duct and facing downstream of the direction of cooling air flow in the duct, and pressure air supply means connected to supply air under pressure to said nozzle means thereby to induce a flow of air through said duct, comprising also means responsive to an operating variable associated with the engine and which increases with increase of the ram pressure in the engine intake, and valve means operable to control the supply of air from said pressure air supply means to the nozzle means and connected to said variable-responsive means to be closed when said operating variable exceeds a preselected value.

References Cited in the file of this patent

UNITED STATES PATENTS

| | | |
|---|---|---|
| 2,503,250 | Eckert | Apr. 11, 1950 |
| 2,582,848 | Price | Jan. 15, 1952 |
| 2,652,216 | Hoffman | Sept. 15, 1953 |
| 2,671,315 | Rocheville | Mar. 9, 1954 |
| 2,749,087 | Blackman et al. | June 5, 1956 |

FOREIGN PATENTS

| | | |
|---|---|---|
| 860,754 | Germany | Dec. 22, 1952 |